United States Patent
Lee

(12) United States Patent (10) Patent No.: US 6,505,579 B1
(45) Date of Patent: Jan. 14, 2003

(54) SYSTEM AND PROCESS FOR WATER INJECTION CONTROL OF INTERNAL COMBUSTION ENGINE

(76) Inventor: Te-Fa Lee, 11th Floor, No. 31, Lane 160, Chiauhe Road, Junghe City, Taipei 235 (TW)

( * ) Notice: Subject to any disclaimer, the term of this patent is extended or adjusted under 35 U.S.C. 154(b) by 0 days.

(21) Appl. No.: 09/962,557

(22) Filed: Sep. 25, 2001

(51) Int. Cl.⁷ .................................................. F02B 47/02
(52) U.S. Cl. .................... 123/25 A; 123/478; 123/25 M
(58) Field of Search ........................... 123/25, 198, 478

(56) References Cited

U.S. PATENT DOCUMENTS

| | | | |
|---|---|---|---|
| 4,094,829 A | | 6/1978 | Spears ..................... 123/25.1 |
| 4,541,367 A | * | 9/1985 | Lindberg ................. 123/25 M |
| 5,694,908 A | * | 12/1997 | Hsu ........................... 123/637 |
| 5,904,121 A | * | 5/1999 | Mezheritsky et al. ..... 123/25 C |
| 6,112,705 A | | 9/2000 | Nakayama et al. ....... 123/25 C |

* cited by examiner

Primary Examiner—Erick Solis
(74) Attorney, Agent, or Firm—Volpe and Koenig, P.C.

(57) ABSTRACT

A system and a method for controlling water injection of an internal combustion engine are disclosed. A proper amount of water is injected into the internal combustion engine serving as a core carrier to enlarge the contact area of the gasoline fuel with the combustion-supporting air, and reduce the overall temperature of the combustion chamber. The system monitors the revolving rate of the engine to control the water intake timing. Giving a car engine as an example, when the driver releases the accelerator significantly, no water is required to enter the combustion chamber of the engine practically. Therefore, the control system stops to inject water into the car engine once it detects a quick drop of the revolving rate of the engine.

16 Claims, 3 Drawing Sheets

SYSTEM AND PROCESS FOR WATER INJECTION CONTROL OF INTERNAL COMBUSTION ENGINE

FIELD OF THE INVENTION

The present invention relates to a system for controlling the injection of a liquid carrier into an internal combustion engine, and more particularly to a system for controlling the injection timing of a liquid carrier into an internal combustion engine to improve the combustion effect. The present invention also relates to a process for controlling the injection of a liquid carrier into an internal combustion engine.

BACKGROUND OF THE INVENTION

As understood, an internal combustion engine utilizes the combustion reaction of gasoline fuel to generate power required for the moving of a vehicle. The combustion effect can be improved by introducing humid air into the combustion reaction of the fuel, as observed from the variations of engine power and fuel consumption versus humidity and as described in U.S. Pat. No. 4,096,829, which is incorporated herein for reference. When atomized gasoline intake and atomized water intake encounter with each other in the combustion chamber 30, the gasoline particles are subject to wrapping around the surfaces of water particles 40 to form thin films 41 on respective water carriers, as shown in FIG. 1A, thereby increasing the contact area of the gasoline with the combustion-supporting air. Once the engine operates in a compression program, elevated temperature and pressure result in even smaller gasoline-coated water particles, as shown in FIG. 1B. Accordingly, the overall contact area and thus the mixing ratio of the gasoline with air is even increased so as to improve the combustion efficiency. Meanwhile, the engine power is increased, and the fuel consumption is reduced. On the other hand, the injection of proper amount of water into the combustion chamber together with the fuel may lower the combustion temperature so as to reduce the discharge of $NO_x$, as described in U.S. Pat. No. 6,112,705, which is also incorporated herein for reference.

For achieving the above purposes, various control systems have been proposed to inject water into the combustion chamber. Those techniques, although involves on the water injection to improve the combustion effect, and some of them use control the water amount in precision. These techniques, however, are not particularly concerned about the injection timing of water injection control, so it may disadvantageously result in a non-optimized water ratio. As is known, the improper proportion of gasoline to water is likely to hinder the engine from outputting power so as to cause the vehicle to stall.

SUMMARY OF THE INVENTION

Therefore, an object of the present invention is to provide a system for controlling the injection of a liquid carrier into an internal combustion engine, which supplies water for the combustion reaction in proper timing in order to avoid stalling.

A first aspect of the present invention relates to an injection control system for controlling the injection of a fuel carrier into an internal combustion engine to support thereon a fuel. The injection control system includes a carrier tank for storing therein a fuel carrier; a carrier injector in communication with the carrier tank and a combustion chamber of an internal combustion engine for optionally providing the fuel carrier for the internal combustion engine to mix with a fuel; and a control circuit electrically connected to the carrier injector for controlling an injection operation of the carrier injector, and outputting a disable signal to stop the carrier injector from injecting the fuel carrier into the combustion chamber when a revolving-rate drop of the internal combustion engine exceeds a first threshold value during a predetermined period.

Preferably, the carrier tank is a water tank for storing water as the fuel carrier.

In an embodiment, the control circuit includes a micro-controller. The micro-controller is electrically connected to a revolving-rate output end for receiving revolving-rate signals indicative of revolving rate values. The micro-controller outputs an enable signal to actuate the injection operation of the carrier injector in response to a revolving rate higher than a second threshold value, and outputs a disable signal in response to a revolving rate no higher than the second threshold value. Further the micro-controller outputs the disable signal in response to a revolving rate higher than a third threshold value and a revolving-rate drop larger than the first threshold value during the predetermined period. Preferably, the third threshold value is higher than the second threshold value.

In an embodiment, the carrier injector includes a connecting tube in communication with the carrier tank and an intake manifold of the internal combustion engine for passing therethrough the fuel carrier; and a magneto valve device associated with the connecting pipe and electrically connected to the control circuit for optionally performing the injection operation in response to the enable/disable signal outputted by the control circuit.

Preferably, the injection control system further includes a carrier reservoir in communication with the carrier tank for supplying the fuel carrier to the carrier tank when a stock amount of the fuel carrier in the carrier tank is lower than a first predetermined level.

Preferably, the injection control system further includes a first carrier sensor mounted to the carrier tank and electrically connected to the control circuit for informing that a stock amount of the fuel carrier in the carrier tank is lower than the first predetermined level by outputting a supply signal; a carrier pump electrically connected to the control circuit for transporting the fuel carrier from the carrier reservoir to the carrier tank in response to the supply signal; and a second carrier sensor mounted to the carrier reservoir and electrically connected to the control circuit for informing that a stock amount of the fuel carrier in the carrier reservoir is lower than a second predetermined level by outputting a warning signal.

More preferably, the injection control system further includes a trouble-detection circuit electrically connected to the control circuit, the first and second carrier sensors, the carrier pump and the carrier injector for detecting respective operational states, and outputting an informing signal to have the control circuit output a corresponding voice-alarm signal to specify a malfunction situation; and a voice generating circuit electrically connected to the control circuit for sending out a pre-stored voice to broadcast the malfunction situation in response to the voice-alarm signal.

A second aspect of the present invention relates to the use of the injection control system as recited above for controlling water injection into a vehicular engine as a fuel carrier to support gasoline.

A third aspect of the present invention relates to a process for controlling the injection of a fuel carrier into an internal combustion engine to support thereon a fuel. The process includes steps of sequentially receiving a series of revolving-rate signals indicative of a series of revolving rates; outputting a first disable signal in response to a revolving-rate drop exceeding a first threshold value; and inhibiting the injection of the fuel carrier into the internal combustion engine in response to the disable signal.

Preferably, the first disable signal is outputted when a revolving rate is higher than a second threshold value and a revolving-rate drop exceeds the first threshold value during a predetermined period.

More preferably, the process further includes steps of comparing the series of revolving rates with a third threshold value; outputting an enable signal in response to a revolving rate higher than the third threshold value; and outputting a second disable signal in response to a revolving rate no higher than the second threshold value.

For example, the first threshold value is about 500 rpm, the predetermined period is about 0.5 seconds, the second threshold value is about 2000 rpm, and the third threshold value is about 1200 rpm.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
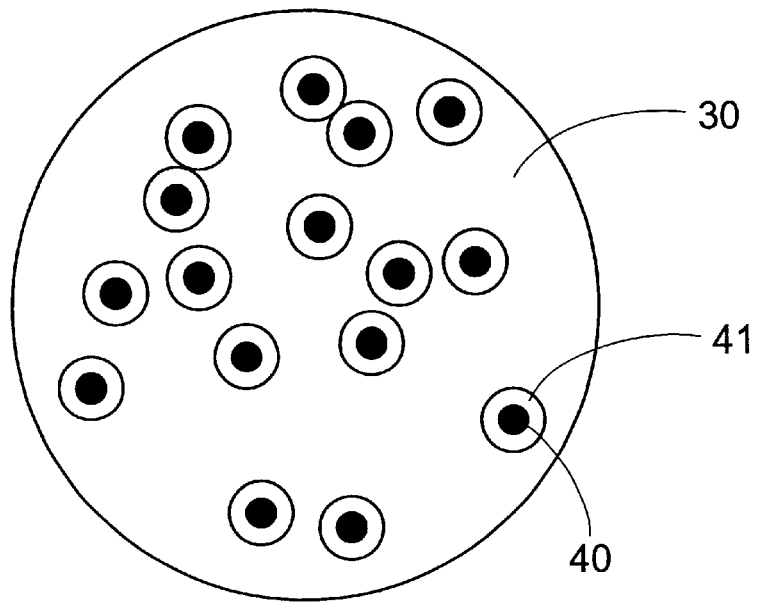
FIG. 1A is a schematic diagram showing the mixing of water and gasoline in a combustion chamber.
Figure 1B:
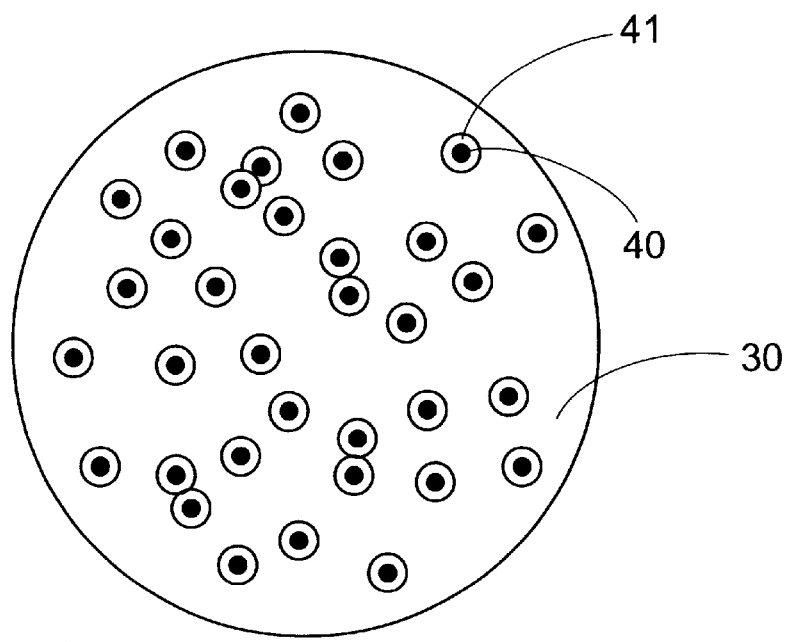
FIG. 1B is a schematic diagram showing the split and mixing of water and gasoline in a combustion chamber.
Figure 2:
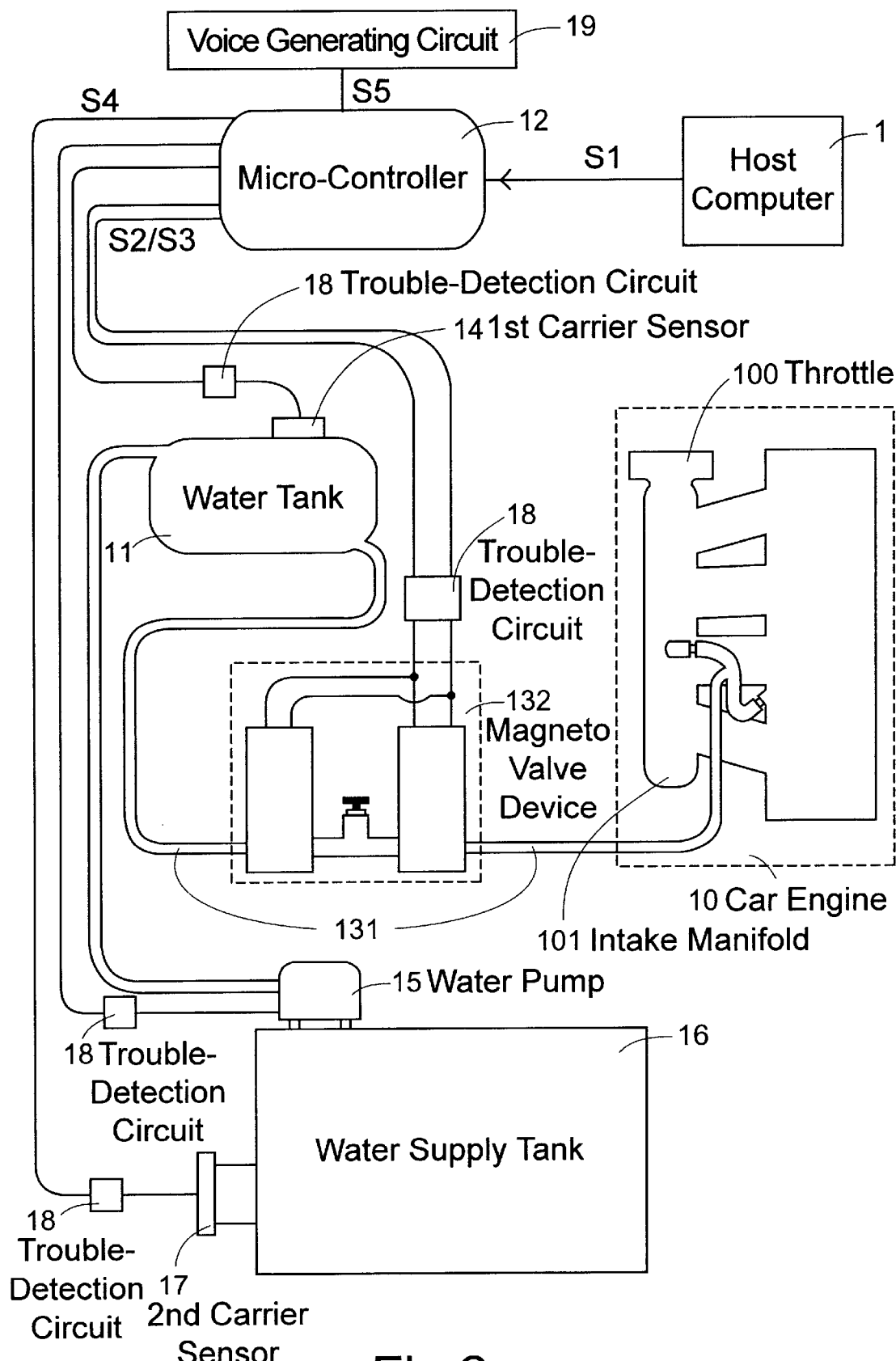
FIG. 2 is a schematic diagram showing a preferred embodiment of a injection control system according to the present invention.

Please refer to FIG. 2 which is a schematic diagram showing a preferred embodiment of an injection control system according to the present invention. The system includes a water tank 11, a micro-controller 12, a connecting tube 131, a magneto valve device 132, a first carrier sensor 14, a water pump 15, a water supply tank 16, a second carrier sensor 17, a trouble-detection circuit 18 and a voice generating circuit 19 interconnected as shown. The micro-controller 12 serially receives revolving-rate signals S1 from the host computer 1 of a car to realize the values and the variations of the revolving rates. When the driver steps on the accelerator of the car to increase the revolving rate of the engine 10, it is required to inject water into the combustion chamber of the engine to facilitate the combustion reaction as aforementioned. Accordingly, the micro-controller 12 outputs an enable signal S2 to switch on the magneto valve device 132 to allow water flow from the water tank 11 to the intake manifold 101 of the engine 10 via the connecting tube 131 when the revolving rate exceeds a predetermined level, e.g. 1200 rpm. On the contrary, the micro-controller 12 outputs an disable signal S3 to switch off the magneto valve device 132 so as to inhibit water injection into the intake manifold 101 behind the throttle 100 if the revolving rate has not reached the predetermined level yet. By this way, the stalling problem resulting from the undue water ratio can be preliminary solved.

Figure 3:
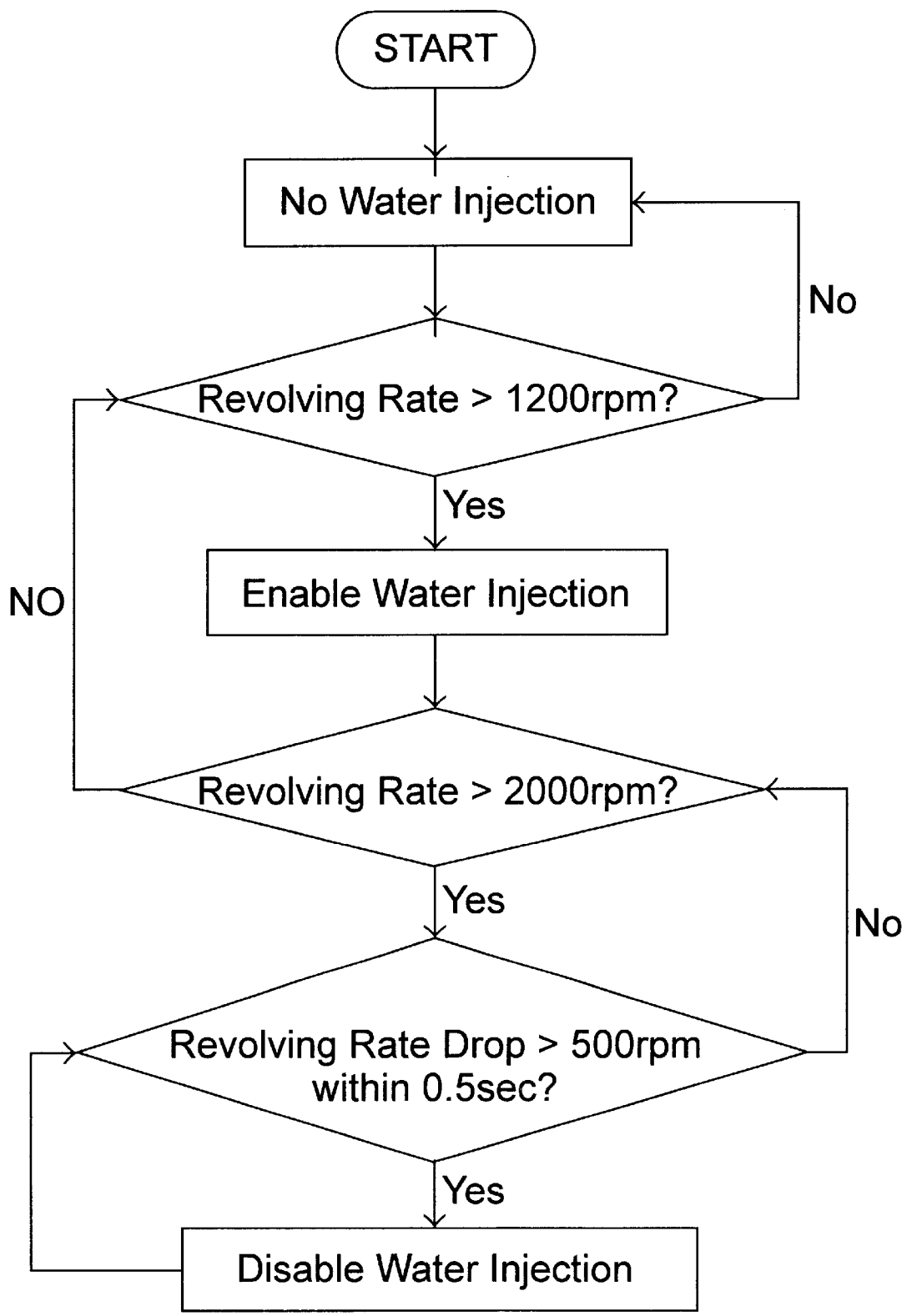
FIG. 3 is a flowchart schematically showing the principle of the present invention to control the water injection timing.

However, for a certain situation that the revolving rate exceeds 1200 rpm, water injection is still undesired. As is known, a proper amount of water is injected into the internal combustion engine for serving as a core carrier to enlarge the contact area of the gasoline fuel with the combustion-supporting air, and reducing the overall temperature of the combustion chamber. In order to achieve this purpose, it is necessary to carefully control the water-fuel ratio. Therefore, the system monitors the revolving rate of the engine control the water intake timing. In a situation that the driver releases the accelerator significantly, no water is required to enter the combustion chamber of the engine even if the revolving rate is quite high. Therefore, the control system stops to inject water into the car engine once it detects a quick drop of the revolving rate of the engine. Conclusively, an embodiment of the water-injection control process according to the present invention is illustrated with reference to the flowchart of FIG. 3. When the revolving rate of the engine is no higher than a predetermined value, e.g. 1200 rpm, no water injection is performed. When the revolving rate is higher than 1200 rpm, a further discrimination operation is performed to determine whether the user is releasing the accelerator. That is, the revolving rate is compared with another predetermined value, e.g. 2000 rpm. When the revolving rate is higher than 2000 rpm, and a quick revolving-rate drop, e.g. 500 rpm drop within 0.5 seconds, is observed, it is determined that the driver is releasing the accelerator so that no water injection is required. In this embodiment, if the revolving rate is maintained between 1200 rpm and 2000 rpm, water is kept on entering the combustion chamber in a proper amount.

In the preferred embodiment shown in FIG. 2, the additional water supply tank 16 which is larger than the water tank 11 in general, is used for supplying water to the water tank 11. When the liquid level in the water tank 11 is detected to be lower than a predetermined value by the sensor 14, the micro-controller 12 will have the water pump 15 to transport water in the water supply tank 16 to the water tank 11. When the sensor 17 of the water supply tank 16 detects that the water level of the water supply tank 16 is lower than a predetermined value, the micro-controller will output an alarm signal to inform the user. Further, in order to detect malfunction in time especially before the engine is started, a plurality of sensors, a trouble-detection device and a trouble-informing device are provided. Two sensors 14 and 17 are provided for detecting the carrier stock levels in the water tanks 11 and 18, respectively. The trouble-detection circuit 18 is provided for detecting the operational states of the sensors 14, 17, the water pump 15 and the magneto valve device 132. When there occurs any unusual situation, the trouble-detection circuit 18 will output an informing signal S4 to inform the micro-controller 12 of the abnormal part. The micro-controller 12 then outputs a corresponding voice-alarm signal S5 to specify the malfunction situation and to have the voice generating circuit 19 to send out a corresponding pre-stored voice.

By using the injection control system and process according to the present invention, the water carrier can be injected into the combustion chamber of the engine in proper timing so as to prevent the engine from the possible stalling situation resulting from a non-optimized water ratio.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An injection control system for controlling the injection of a fuel carrier into an internal combustion engine to support thereon a fuel, comprising:

a carrier tank for storing therein a fuel carrier;

a carrier injector in communication with said carrier tank and a combustion chamber of an internal combustion engine for optionally providing said fuel carrier for said internal combustion engine to mix with a fuel; and a control circuit electrically connected to said carrier injector for controlling an injection operation of said carrier injector, and electrically connected to a revolving-rate output end for receiving revolving-rate signals indicative of revolving rate values, said control circuit outputting an enable signal to actuate said injection operation of said carrier injector in response to a revolving rate higher than a first threshold value, and outputting a disable signal either in response to a revolving rate no higher than said first threshold value or in response to a revolving rate higher than a second threshold value and a revolving-rate drop larger than a third threshold value during a predetermined period.

2. The injection control system according to claim 1 wherein said carrier tank is a water tank for storing water as said fuel carrier.

3. The injection control system according to claim 1 wherein said control circuit includes a micro-controller.

4. The injection control system according to claim 1 wherein said carrier injector includes:

a connecting tube in communication with said carrier tank and an intake manifold of said internal combustion engine for passing therethrough said fuel carrier; and a magneto valve device associated with said connecting pipe and electrically connected to said control circuit for optionally performing said injection operation in response to said enable/disable signal outputted by said control circuit.

5. The injection control system according to claim 1 further comprising a carrier reservoir in communication with said carrier tank for supplying said fuel carrier to said carrier tank when a stock amount of said fuel carrier in said carrier tank is lower than a first predetermined level.

6. The injection control system according to claim 5 further comprising:

a first carrier sensor mounted to said carrier tank and electrically connected to said control circuit for informing that a stock amount of said fuel carrier in said carrier tank is lower than said first predetermined level by outputting a supply signal;

a carrier pump electrically connected to said control circuit for transporting said fuel carrier from said carrier reservoir to said carrier tank in response to said supply signal; and a second carrier sensor mounted to said carrier reservoir and electrically connected to said control circuit for informing that a stock amount of said fuel carrier in said carrier reservoir is lower than a second predetermined level by outputting a warning signal.

7. The injection control system according to claim 6 further comprising:

a trouble-detection circuit electrically connected to said control circuit, said first and second carrier sensors, said carrier pump and said carrier injector for detecting respective operational states, and outputting an informing signal to have said control circuit output a corresponding voice-alarm signal to specify a malfunction situation; and a voice generating circuit electrically connected to said control circuit for sending out a pre-stored voice to broadcast said malfunction situation in response to said voice-alarm signal.

8. The use of said injection control system set forth in claim 1 for controlling water injection into a vehicular engine as a fuel carrier to support gasoline.

9. A process for controlling the injection of a fuel carrier into an internal combustion engine to support thereon a fuel, comprising steps of:

sequentially receiving a series of revolving-rate signals indicative of a series of revolving rates;

outputting a first disable signal in response to a revolving-rate drop exceeding a first threshold value; and inhibiting the injection of said fuel carrier into said internal combustion engine in response to said disable signal.

10. The process according to claim 9 wherein said first disable signal is outputted when a revolving rate is higher than a second threshold value and a revolving-rate drop exceeds said first threshold value during a predetermined period.

11. The process according to claim 10 further comprising steps of:

comparing said series of revolving rates with a third threshold value;

outputting an enable signal in response to a revolving rate higher than said third threshold value; and outputting a second disable signal in response to a revolving rate no higher than said third threshold value.

12. The process according to claim 11 wherein said second threshold value is higher than said third threshold value.

13. The process according to claim 12 wherein said second threshold value is about 2000 rpm.

14. The process according to claim 12 wherein said third threshold value is about 1200 rpm.

15. The process according to claim 9 wherein said fuel carrier is liquid water.

16. The process according to claim 9 wherein said internal combustion engine is a vehicular engine.

* * * * *